(12) United States Patent
Hetherington et al.

(10) Patent No.: US 6,262,725 B1
(45) Date of Patent: *Jul. 17, 2001

(54) METHOD FOR DISPLAYING HOLIDAYS IN A LOCALE-SENSITIVE MANNER ACROSS DISTRIBUTED COMPUTER ENTERPRISE LOCALES

(75) Inventors: David James Hetherington, Austin, TX (US); David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/151,231

(22) Filed: Sep. 10, 1998

(51) Int. Cl.[7] ....................................................... G06F 3/00
(52) U.S. Cl. ......................... 345/333; 345/329; 345/963; 709/203
(58) Field of Search ..................................... 345/333, 334, 345/335, 331, 329, 963, 971; 709/201, 203, 205, 219

(56) References Cited

U.S. PATENT DOCUMENTS

| | | | |
|---|---|---|---|
| 5,855,006 | * 12/1998 | Huemoeller et al. | 705/9 |
| 5,893,073 | * 4/1999 | Kasso et al. | 705/8 |
| 5,960,406 | * 9/1999 | Rasansky et al. | 705/9 |
| 6,018,343 | * 1/2000 | Wang et al. | 345/356 |
| 6,111,572 | * 8/2000 | Blair et al. | 345/333 |

* cited by examiner

Primary Examiner—Raymond J. Bayerl
Assistant Examiner—Cao H. Nguyen
(74) Attorney, Agent, or Firm—Duke W. Yee; Jeffrey S. LaBaw

(57) ABSTRACT

A display method operative within a display device of a data processing system connected in a distributed computing environment having nodes located across geographically-dispersed boundaries. The method begins by defining a set of holiday objects corresponding to a set of holidays specific to a given locale. The calendar, together with at least one holiday defined by at least one of the set of holiday objects, are then selectively displayed if the data processing system is operative within the given locale. Preferably, a given holiday object is defined according to an object-oriented class construct to facilitate implementation of the inventive holiday display calendar using local object-oriented resources.

28 Claims, 10 Drawing Sheets

METHOD FOR DISPLAYING HOLIDAYS IN A LOCALE-SENSITIVE MANNER ACROSS DISTRIBUTED COMPUTER ENTERPRISE LOCALES

BACKGROUND OF THE INVENTION (This application includes matter protected by copyright. All rights are reserved.)

TECHNICAL FIELD

The present invention is directed to managing a large distributed computer enterprise environment and, in particular, to graphic display methods for use in displaying locale-sensitive information such as local holidays.

DESCRIPTION OF THE RELATED ART

Large organizations now desire to place all of their computing resources on a computer network. To this end, it is known to connect computers in a large, geographically-dispersed network environment and to manage such an environment in a distributed manner. One such management framework consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users.

Managed nodes are often located across national boundaries. Thus, a typical managed network of the type described above may include offices located in numerous countries. Multinational companies that operate such networks must deal with scheduling administrative events in these different locales. These locales, however, often have different holidays that impact such scheduling. As an example, assume the enterprise desires to upgrade each endpoint computer in a managed region with a new version of a large computer program. Obviously, it would not be desirable to distribute this new load during the day when computer users are otherwise occupied and working. A better solution would be to distribute the new program files on a day in which the system usage is relatively low, e.g., a holiday, such as U.S. Independence Day, July 4th. Independence Day, of course, is not a holiday outside the United States. Thus, while distribution on July 4th would make sense for those endpoint computers operating within the United States, such distribution would be undesirable in the Company's other offices (e.g., the United Kingdom, Egypt, Italy and the like).

Thus, to the extent a large managed region crosses country boundaries, it is necessary to deal with the problem of scheduling management tasks while taking into consideration local holidays or other events that may impact such scheduling.

The present invention addresses this problem.

BRIEF SUMMARY OF THE INVENTION

It is a primary object of this invention to implement a display calendar usable world-wide, presented in a culturally correct format.

It is an object of the present invention to implement locale-sensitive holiday scheduling in a large distributed computer enterprise environment.

It is another object of this invention to provide a display mechanism that enables programs running in multiple locales to deal with different holidays that are significant in the locale.

Yet another object of this invention to provide a user configurable, calendar preferences display mechanism for generating locale-sensitive display calendars in a distributed computer enterprise environment.

Still another object of this invention is to provide a user-configurable, locale-independent holiday listing.

It is another primary object of this invention to display a graphical representation of a monthly calendar and to support multiple calendar styles.

It is a further specific object of the invention to implement a locale-sensitive holiday display mechanism for use in a managed computer enterprise environment spanning the boundaries of culturally-diverse countries.

A more specific object of the present invention is to provide an object-oriented "class" construct that encompasses given information about a locale-specific holiday. The holiday class enables information about specific holidays to be encapsulated and thus easily manipulated by graphic display routines executing on a given computer.

It is a more particular object of the present invention to display a graphical representation of a calendar that adapts its display to the conventions of the locale in which it is being run or the stored preferences of a system administrator. Thus, for example, in an English language, United States locale, weeks start on Sunday and the text for the day of the week and month names are displayed in English. If the locale and language were switched to Italian language and locale, the first day of the week would be Lundi (Monday) and all text displays would be in Italian. This behavior requires no intervention on the part of the programmer or user.

Each system is provided with a separate resource list of holidays for each supported locale. In unsupported locales, preferably a default resource is used since the locale-specific resource is not provided. The default resource contains no holiday specifiers, so the calendar will not have any holidays displayed. This prevents inappropriate display of holidays that are not observed in the locale. Other holidays may be added by the user to create their own locale-specific resource.

In accordance with the invention, a display method is operative within a display device of a data processing system connected in a distributed computing environment having nodes located across geographically-dispersed boundaries. The method begins by defining a set of holiday objects corresponding to a set of holidays specific to a given locale. The calendar, together with at least one holiday defined by at least one of the set of holiday objects, are then selectively displayed if the data processing system is operative within the given locale. Preferably, a given holiday object is defined according to an object-oriented class construct to facilitate implementation of the inventive holiday display calendar using local object-oriented resources (e.g., Java-based classes).

The foregoing has outlined some of the more pertinent features and objects of the present invention. These features and objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
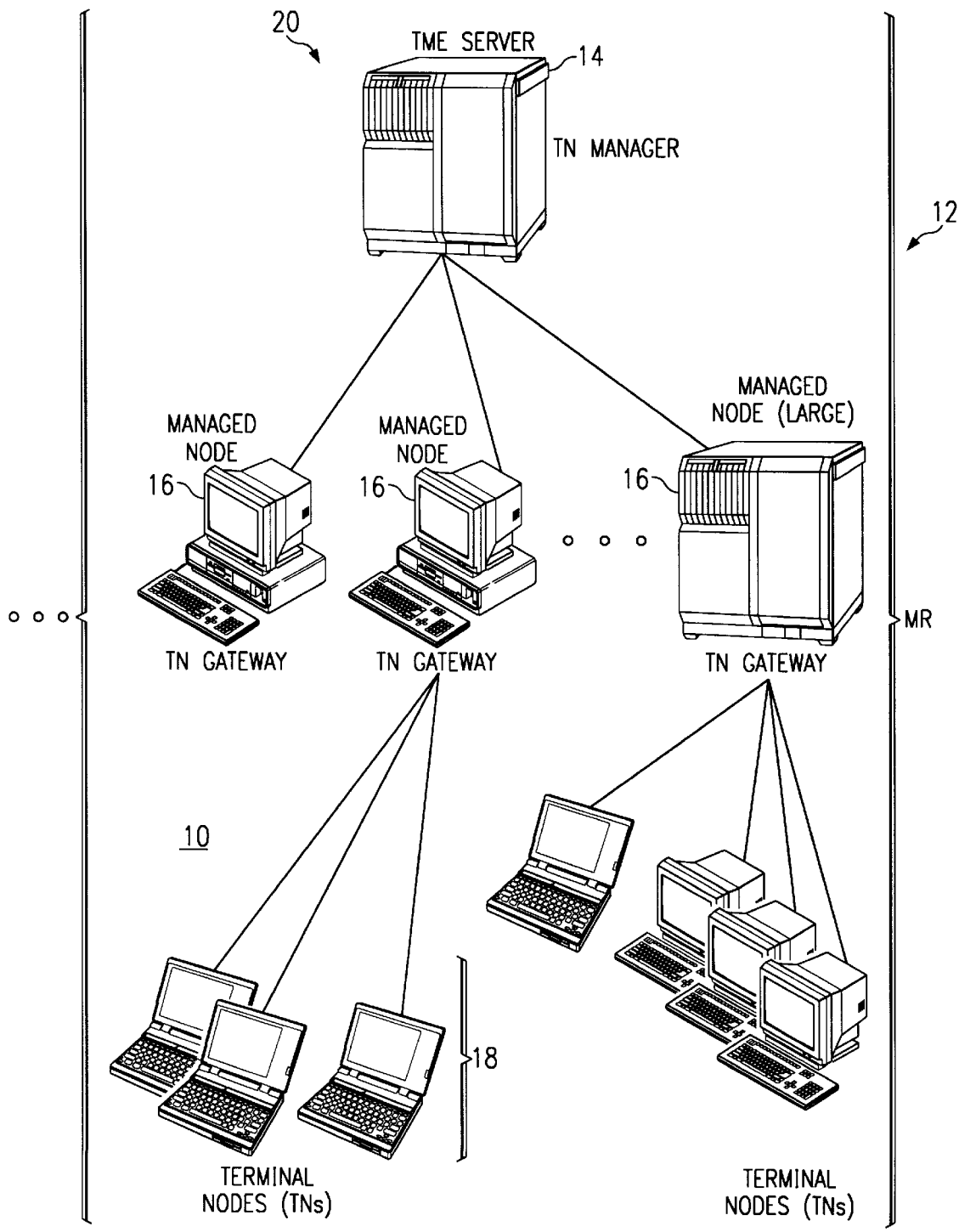
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, thread servers, time servers and the like. Multiple servers 14 coordinate activities across the enterprise and permit remote management and operation. Each server 14 serves a number of gateway machines 16, each of which in turn support a plurality of endpoints 18. The server 14 coordinates all activity within the MR using a terminal node manager 20.

Figure 2:
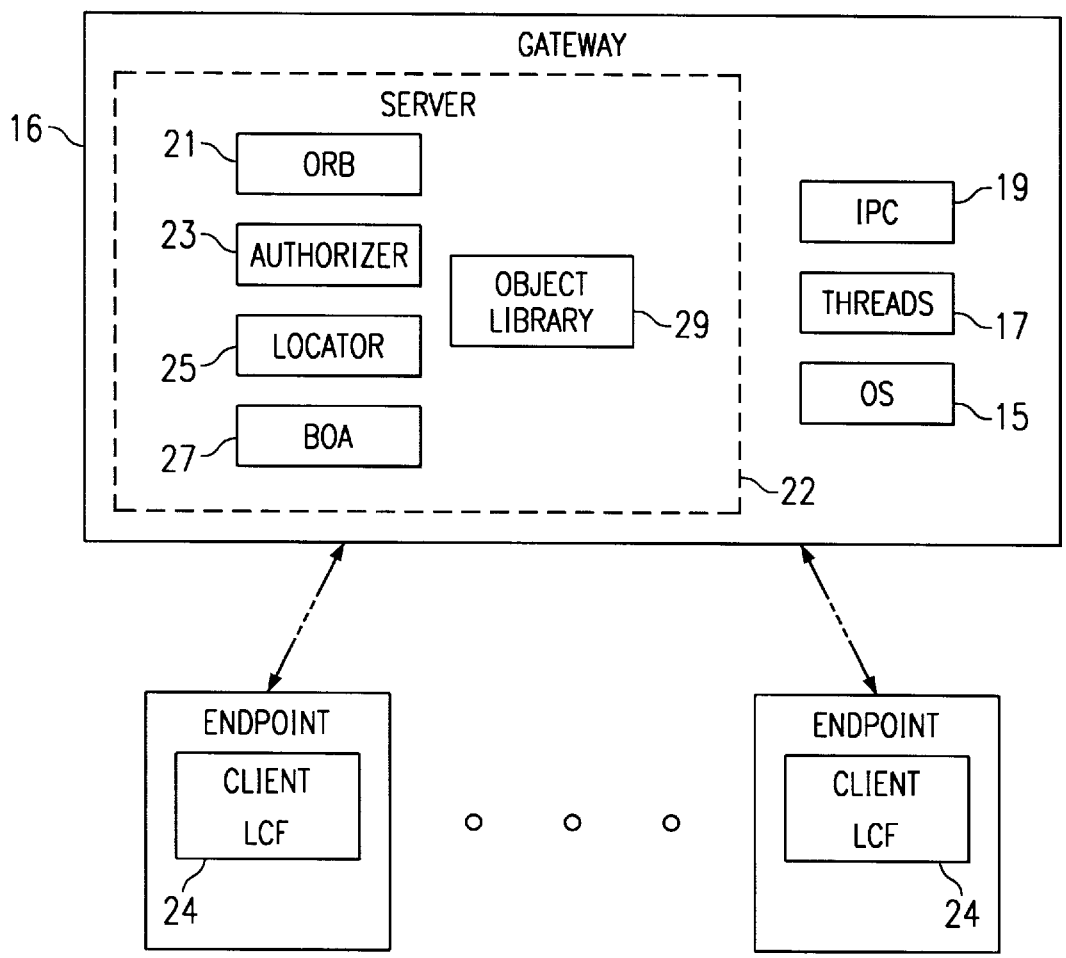
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a thread mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
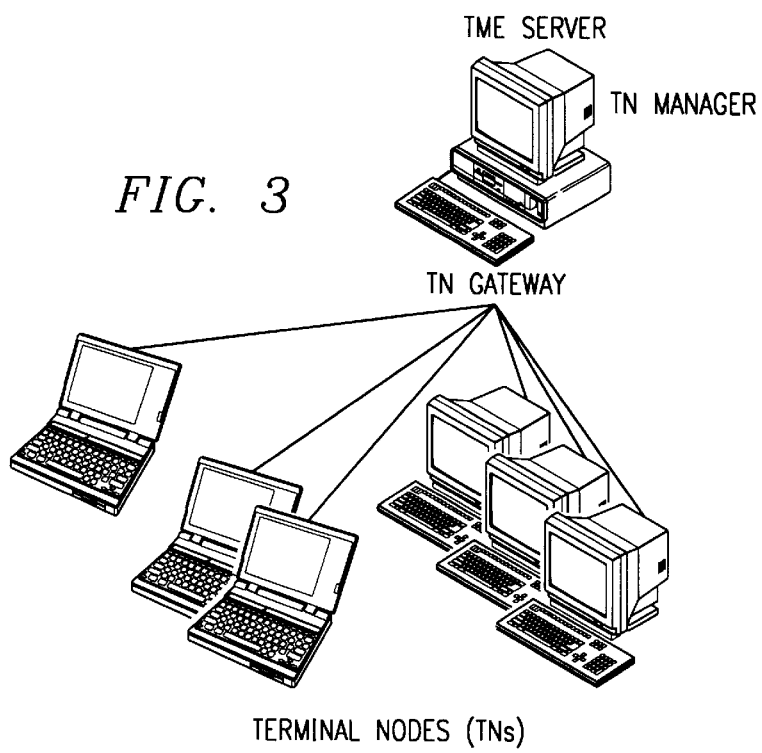
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework. References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. Initially, a gateway "knows" nothing about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2A:
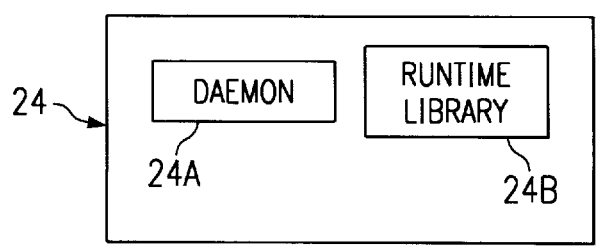
FIG. 2A is a block diagram of the elements that comprise the LCF client component of the system management framework.

As also discussed above, the endpoint is a machine running the system management framework client component, which is referred to herein as a management agent. The management agent has two main parts as illustrated in FIG. 2A: the daemon 24a and an application runtime library 24b. The daemon 24a is responsible for endpoint login and for spawning application endpoint executables. Once an executable is spawned, the daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. Suitable alternative machines include: an IBM-compatible PC x86 or higher running Novell UnixWare 2.0, an AT&T 3000 series running AT&T NIX SVR4 MP-RAS Release 2.02 or greater, Data General ViiON series running DG/UX, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a Web browser such as Netscape Navigator or Microsoft Internet Explorer. An endpoint computer thus may be connected to a gateway via the Internet, an intranet or some other computer network.

Preferably, the client-class framework running on each endpoint is a low-maintenance, low-cost framework that is ready to do management tasks but consumes few machine resources (because it is normally in an idle state). Each endpoint may be "dataless" in the sense that system management data is not stored therein before or after a particular system management task is implemented or carried out.

Figure 4A:
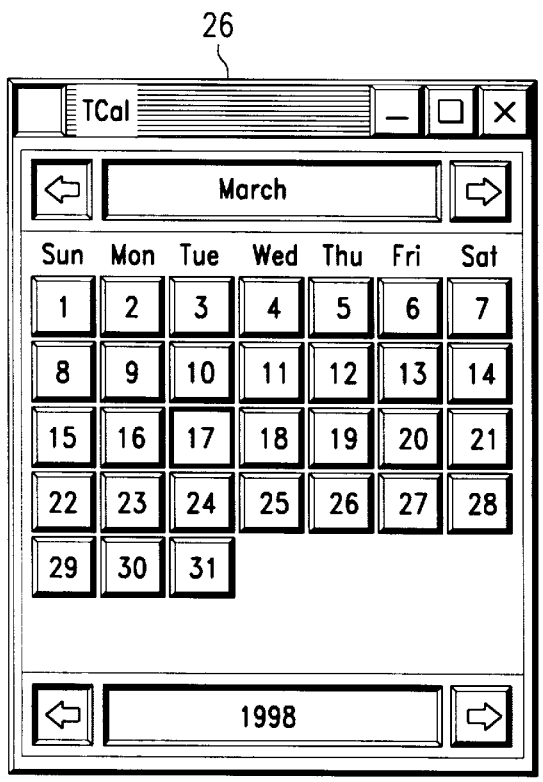
FIG. 4A and FIG. 4B are graphical representations of a monthly calendar illustrated how the calendar adapts its display to the conventions of the locale in which it is being run or the stored preferences of an administrator.
Figure 4B:
Figure 7:
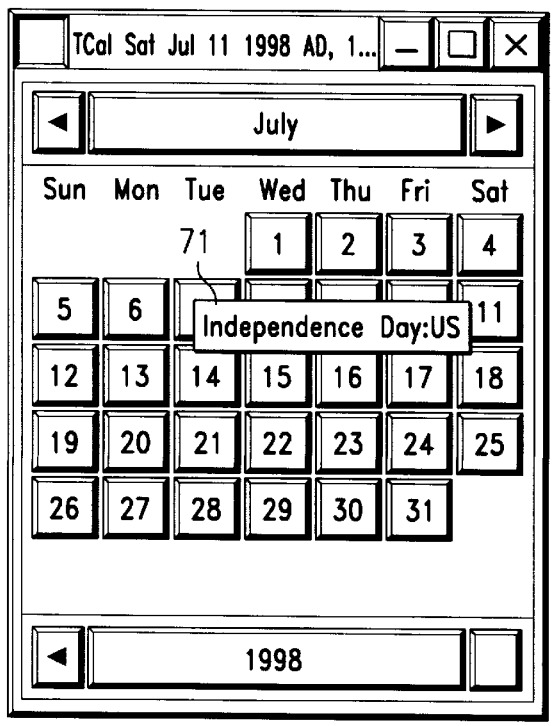
FIG. 7 illustrates a representative U.S.-based monthly calendar displaying a locale-specific holiday in accordance with the present invention.

The present invention implements the display of a holiday calendar for use on computers operative in the large, distributed enterprise environment. As companies extend the geographic reach of the computer networks, many computers in the managed region are located in countries having diverse cultures and customs. As a result, it is desirable to display calendar information (e.g., to system administrators and to users of endpoint computers) in a manner that accommodates these diverse cultures. By way of example, and with reference to FIGS. 4A and 4B, it is an object of the present invention to provide a graphical representation of a calendar that adapts its display to the conventions of the locale in which it is being run or the stored preferences of a system administrator. Thus, for example, in an English language, United States locale, weeks start on Sunday and the text for the day of the week and month names are displayed in English. A representative display calendar for the U.S. locale is illustrated as reference numeral 26 in FIG. 4A. If the locale and language were switched to Italian language and locale, the first day of the week would be lundi (Monday) and all text displays would be in Italian. A representative display calendar 28 for the Italian locale is shown in FIG. 4B. As will be described in more detail below, the locale-sensitive display of calendar information is also used to display local holidays, namely, holidays that have significance within the cultural constraints and customs of the locale in which the computer is located. As will be seen, this behavior preferably requires no intervention on the part of the programmer or user; thus, as the calendar is displayed, appropriate holiday information is retrieved and displayed in a locale-sensitive manner. A representative U.S. holiday calendar (for the month of May) is shown in FIG. 7, with Memorial Day highlighted and called out using flyover text.

To this end, a given computer system operative in the managed environment is provided with a separate resource list of holidays for each supported locale. In unsupported locales, preferably a default resource is used since the locale-specific resource is not provided. The default resource contains no holiday specifiers, so the calendar will not have any holidays displayed. This prevents inappropriate display of holidays that are not observed in the locale. This default operation thus preserves cultural integrity of the display scheme. As will be seen, other holidays may be added by the user to create the user's own locale-specific resource.

Figure 5A:
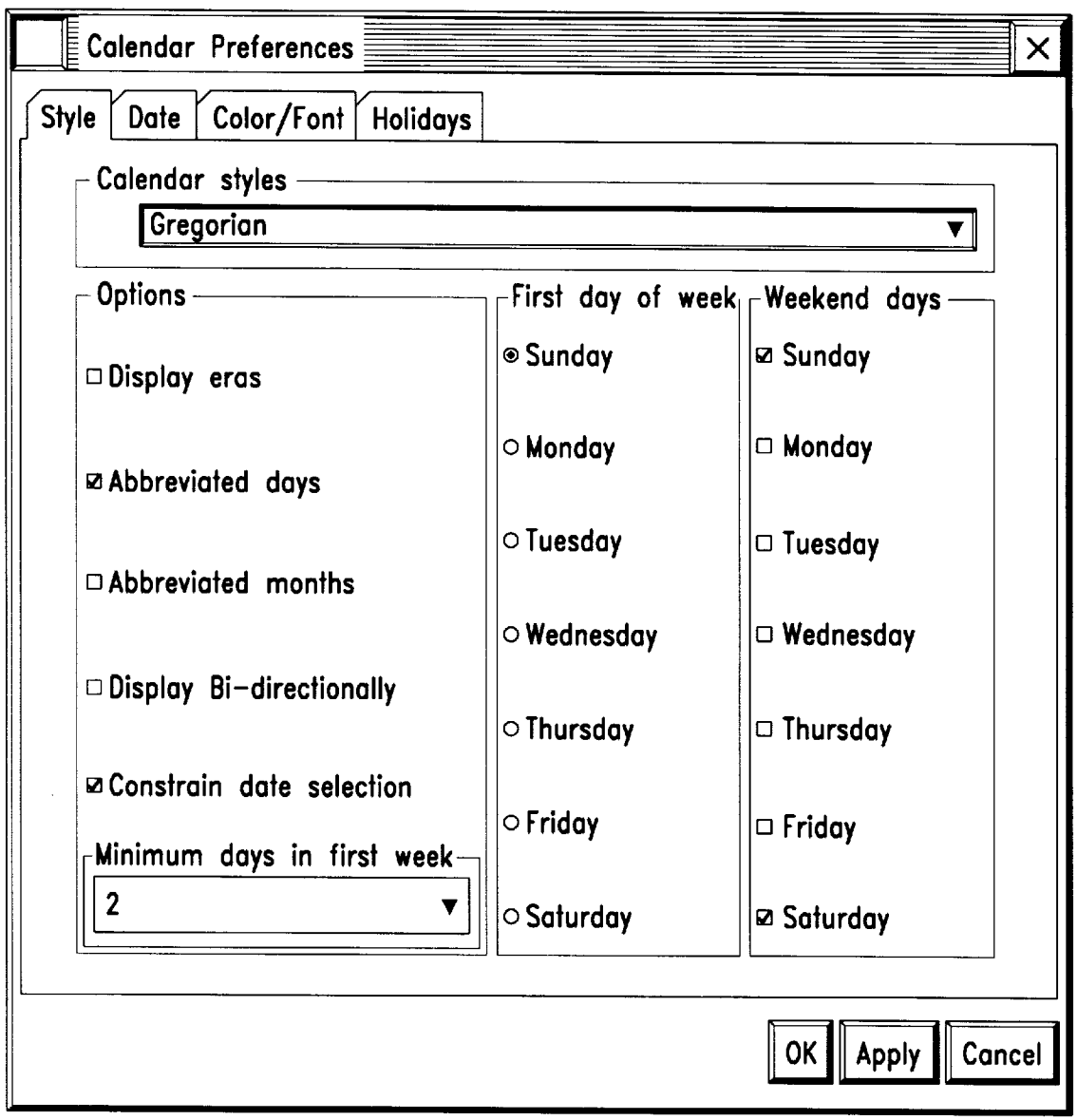
FIGS. 5A–5D illustrate a tabbed panel dialog for selection of calendar preferences.
Figure 5B:
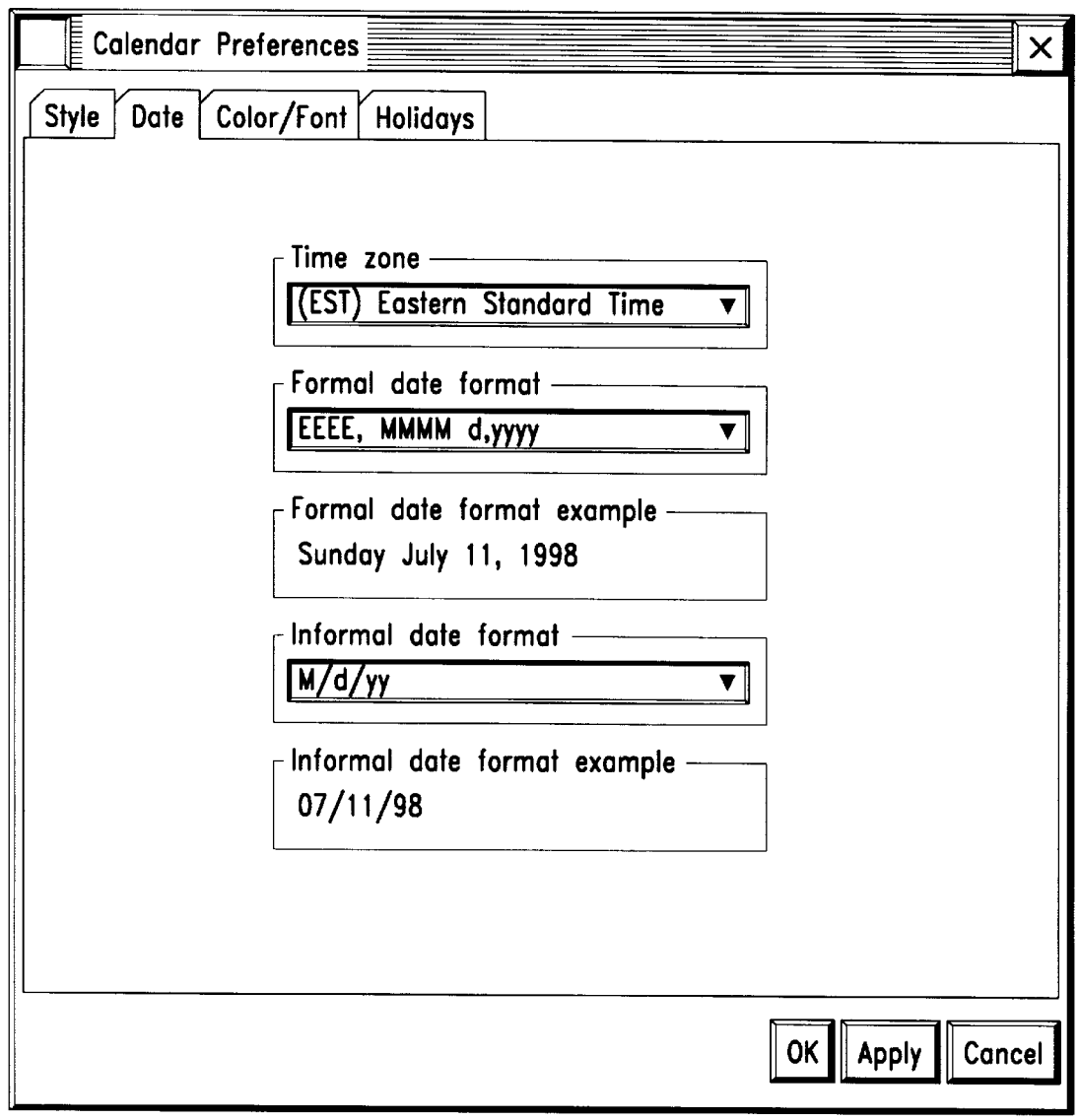
Figure 5C:
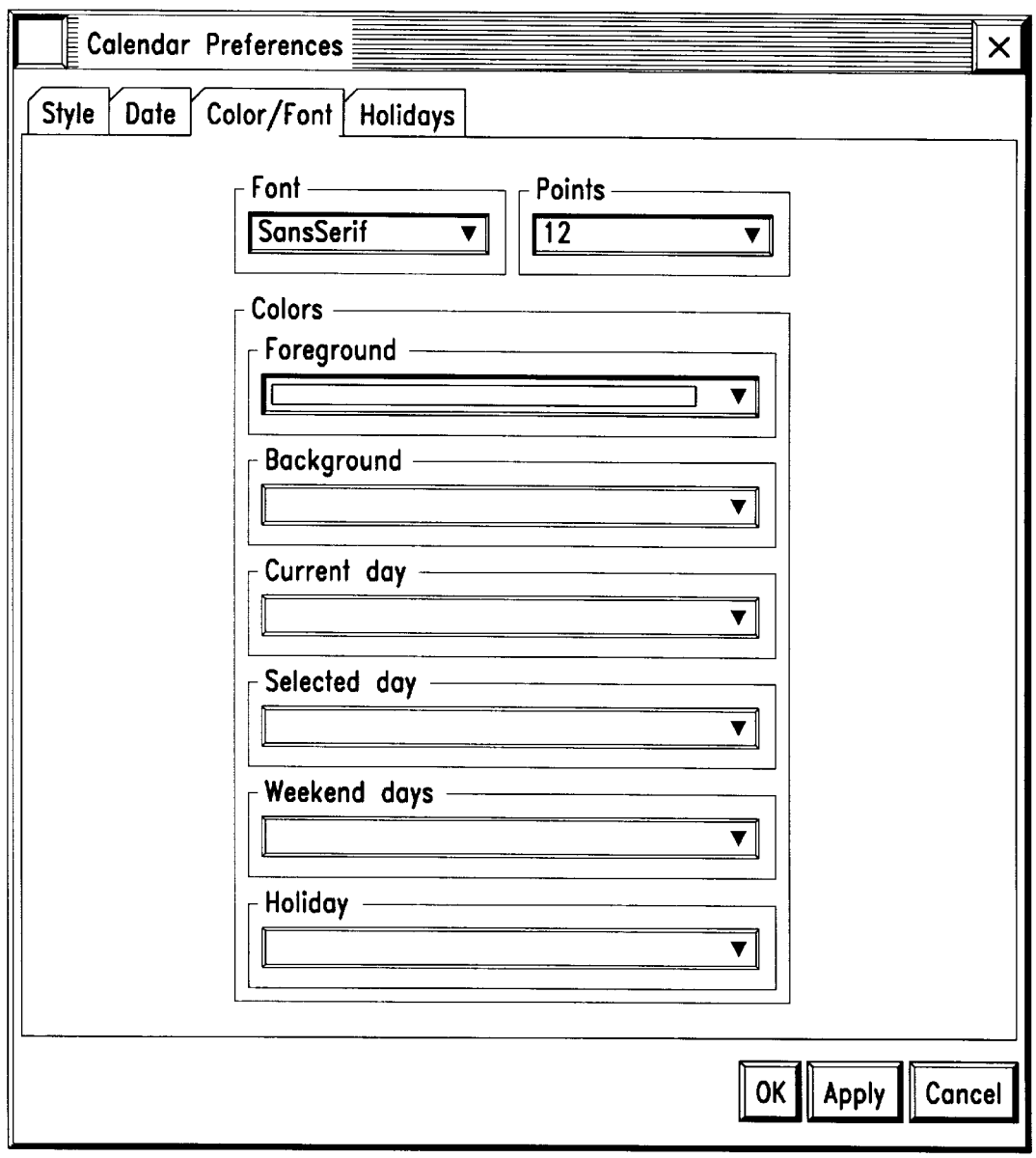
Figure 5D:
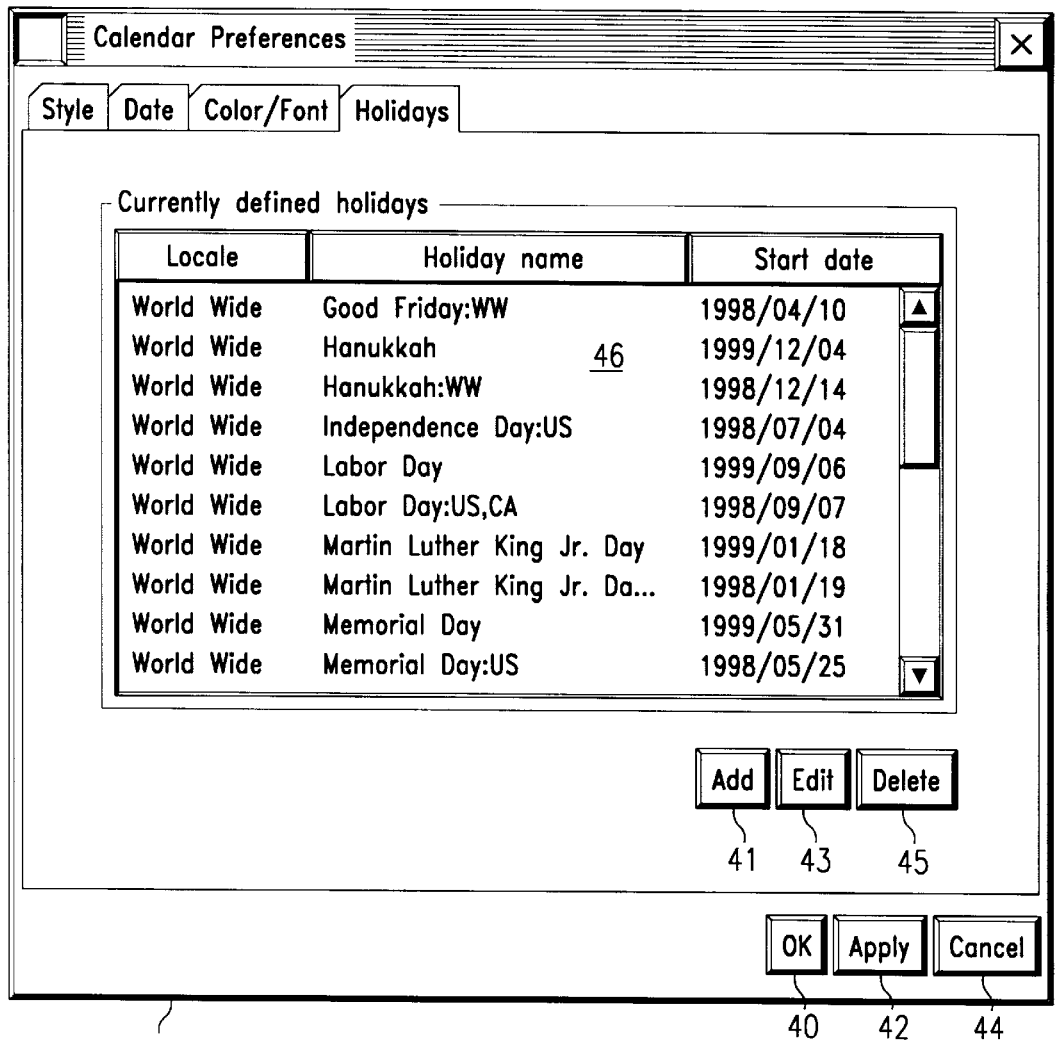

To this end, and in accordance with the invention, a graphical user interface (GUI) tabbed display panel is provided for selection of calendar preferences. FIG. 5A is the Style Panel 32 that gathers all user configurable elements relating to calendar styles. FIG. 5B is the Date Panel 34 that allows the administrator to select preferences of time zone, formal and informal date format. FIG. 5C is the Color/Font Panel 36 that allows the administrator to select preferences of font, font point size and color. FIG. 5D is the Holiday Panel 38, which allows display and creating of holidays on a locale-specific basis. The Holiday Panel 38, as will be seen, allows the user to add, edit and delete holidays. Each panel includes all user configurable settings. Three buttons 40, 42 and 44 (OK, Apply and Cancel) are used to apply or abandon the changes made. Preferably, all calendar preferences are stored on a per administrator basis, although this is not a requirement.

Figure 6:
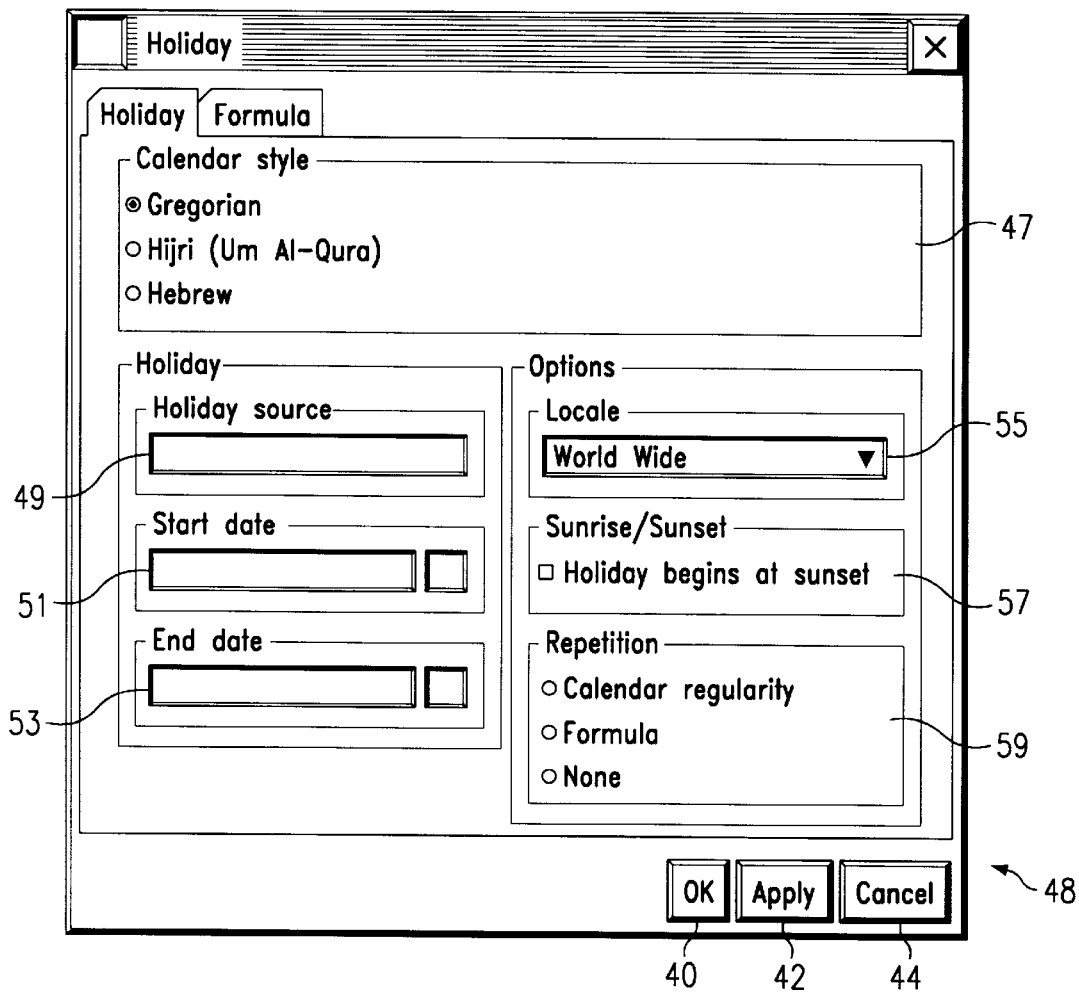
FIG. 6 illustrates an Add Holiday Panel Dialog panel that enables an administrator to define a holiday, specify the locales in which it is observed, and the calendar to which it is mapped.

With reference now to FIG. 5D, the Holiday Panel 38 preferably displays a scrollable list 46 of currently defined holidays, each of which is listed with starting time and ending time. The list 46 is empty in a locale that does not support the holiday display functionality (or in a locale in which no holidays are otherwise to be displayed). By clicking on the Add button 41, the user may add a new holiday. This action brings up an Add Holiday Dialog screen 48 such as illustrated in FIG. 6 and described below. Referring back to FIG. 5D, by clicking the Edit button 43, the user may edit a holiday. This action is enabled when a holiday in the Currently defined holidays list 46 is selected. By clicking the Delete button 45, the user may remove a holiday. This action is also enabled when a holiday in the currently defined holidays list 46 is selected.

Referring now to FIG. 6, the Add Holiday Dialog panel 48 is now described. This panel enables the administrator to define the holiday, to specify the locales it is observed in, and to specify the calendar to which it is mapped. Thus, as illustrated in the figure, the particular Calendar styles (in this case, Gregorian, Hijri (Um Al-Qura) and Hebrew) may be selected in the upper dialog box 47. The name of the Holiday is entered as text in Holiday field 49, and the Start date and End Dates are entered in the respective fields 51 and 53. The Locale is selected using the Locale field 55, with "World Wide" being the default selection. A Sunrise/Sunset selection may be made at field 57, and a Repetition field 59 is used (optionally) to provide additional formatting (e.g., calendar the holiday regularly, calendar according to a given Formula, or none). If the Formula selection is made, an additional dialog (not shown) is brought up to enable the user to define specific rules for calculating the repetition of the holiday. Normally, a holiday would be set up for annual renewal.

The present invention thus provides a convenient mechanism to track and display the difference between working days and non-working days in enterprise management. According to another feature of the present invention, holiday tracking/display is facilitated using an object-oriented construct, e.g., a "class", to define a holiday. The holiday is a class that preferably encapsulates the following information:

| | String sHolidayName | // name of the holiday |
|---|---|---|
| | Vector vLocales | // vector of a locale the holiday is effective in; if null, it is worldwide |
| int | iCalGroup | // calendar style group |
| long | lStartDate | // starting date and time UTC |
| long | lEndDate | // ending date and time UTC |
| boolean | fSunset | // the holiday follows a sunset rule (__ holidays) |
| boolean | fRepeating | // regularly repeating |
| boolean | fOptional | // optional holiday |
| UFCFormula | formulaHoliday | // the formula for the holiday |

Figure 8:
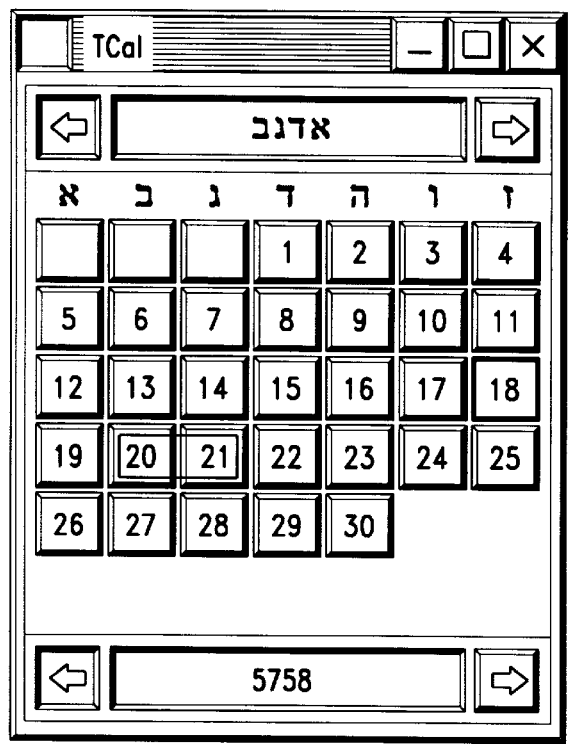
FIG. 8 illustrates a representative Israel-based monthly calendar displaying a locale-specific holiday spanning several days in accordance with the present invention.

The capture of the beginning and ending dates of the holiday allows the definition to describe events that span more than one day. As noted above, this function is provided using the Holiday Dialog Panel 48 and, in particular, the Start and Stop fields 51 and 53. Also, because observance of some religious holidays begin with sundown and ends with sunrise, the present invention enables the administrator to also capture the initiation of a given holiday with respect to a portion of the day. Thus, for example, Jewish holidays normally begin on sundown. A display calendar running on a managed computer in Israel would thus illustrate a typical holiday as beginning at sunset on a given day and then ending on a subsequent day. Thus, two or more days would then be illustrated and displayed as a holiday as shown in FIG. 8. The capture of start and stop time using the object-oriented holiday class construct thus is quite advantageous. Where such information is not specified, however, the default definition of a holiday preferably is one day beginning at 00:00 GMT and ending at the beginning of the following day.

Using the GUI calendar preferences and the class, particular holidays may be defined to be effective on a worldwide basis or only in certain locales. The vector vLocales defined in the holiday class preferably contains the list of locales supported in the distributed computer enterprise environment. Thus, for example, if the managed region includes computers operative in the United States, the United Kingdom and Italy, the vector would include appropriate data identifying those countries. As has been discussed above and illustrated in FIG. 7, holidays are denoted on the visible calendar (e.g., running on an endpoint computer) by a (user configurable) color change from normal days. The calendar will also display the holiday name in the textbox 71 as previously described.

As previously described, a default file is loaded as a resource if the calendar is loaded in a locale that is unsupported. This file preferably contains no holidays so the calendar will not have any holidays displayed. This default operation prevents inappropriate displaying of holidays that are not observed in the locale. For example, U.S. Independence Day (July 4th) is not displayed if the calendar is invoked on a non-U.S. endpoint computer, say, in an Egyptian locale. Using the calendar preferences dialog (FIGS. 5D and 6), however, the users in other locales can create their own list of holidays.

The present invention is conveniently implemented in Java. As is known in the art, Java is an object-oriented, multi-threaded, portable, platform-independent, secure programming environment used to develop, test and maintain software programs. These programs include full-featured interactive, standalone applications, as well as smaller programs, known as applets, that executed by a Java virtual machine (JVM). The basic calendar functionality (called UFCalendar for convenience only) preferably is implemented with the currently available Sun Java Development Kit (JDK 1.1.6) and the Java Foundation Classes (JFC 1.0.2). Familiarity with those resources is presumed in the following discussion.

In particular, the calendar functionality described herein is based upon the Java Calendar abstract base class and uses the Java Gregorian calendar class. Other calendars (e.g., the Hijri and Hebrew calendars) are preferably implemented with subclasses provided by the former Taligent Inc. until such time as Sun provides the classes to support those calendar systems with the JDK.

According to the invention, a Java class file (e.g., CalendarHolidays_en_US.java) contains the basic list of legal holidays for the United States of America. Other holidays may be added by individual administrators using the Add Holiday Dialog as previously described. Supported locales add their own list of holidays during translation. Other holidays may be added by administrators later.

The present invention provides numerous advantages. It provides a calendar usable world-wide, presented in a culturally correct format. It is fully internalized and enabled for all locales and languages supported by the distributed computer enterprise. It provides a user-configurable, locale independent holiday listing. It provides locale-sensitive classes for date and time formatting. The invention further provides a means for selecting single and multiple dates from a graphical representation of a monthly calendar. Multiple calendar styles are supported, and the calendar supports runtime switching between all calendar styles. As noted above, the calendar adapts its display to the conventions of the locale in which it is being run or the stored preferences of the administrator.

Figure 9:
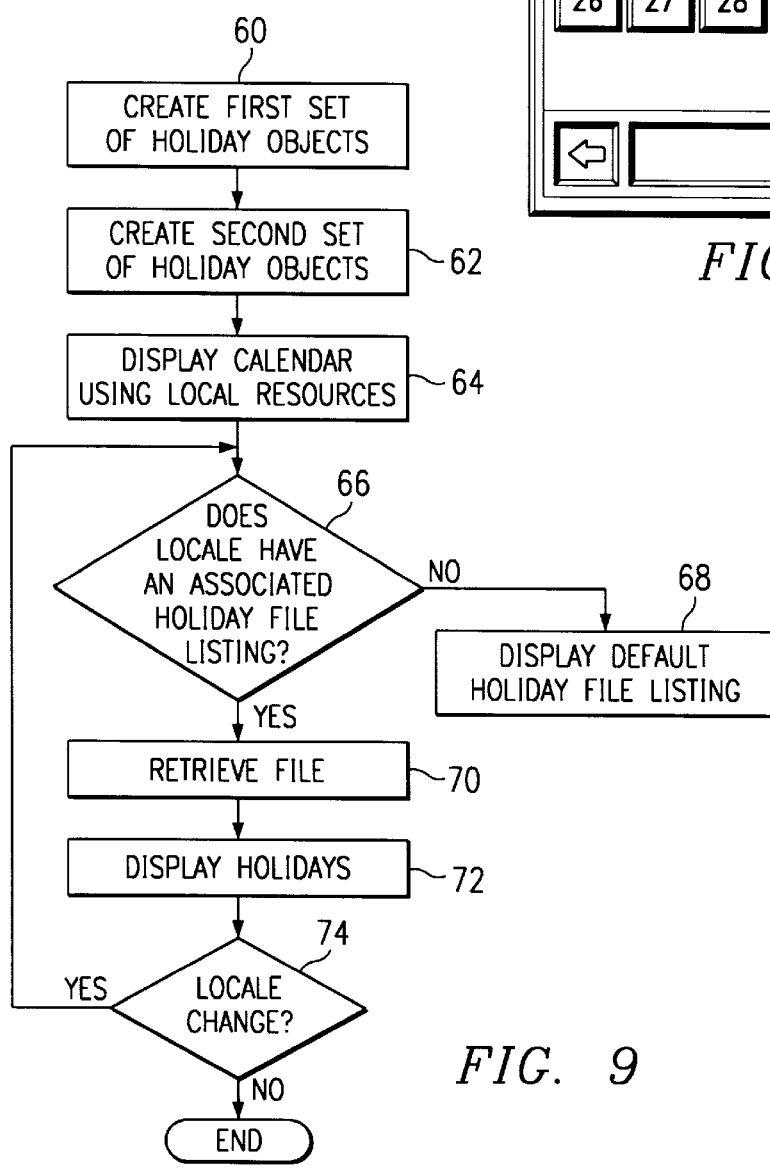
FIG. 9 is a flowchart illustrating runtime switching of locale-sensitive calendars according to the present invention.

FIG. 9 illustrates a flowchart showing the runtime switching functionality of the present invention. The routine begins at step 60 with the creation of a first set of holiday objects that define a set of holidays for a first locale of the distributed computing environment. Continuing with the above example, the first locale is assumed to be a location within the United States, and thus the first set of holiday objects include conventional U.S. holidays; e.g., New Year's Day, Martin Luther King Day, Memorial Day, Independence Day, and the like. Step 60 involves defining an object for each holiday using the class structure described above. The resulting file is saved. At step 62, the administrator creates a second set of holiday objects for a second locale in which the distributed computer environment is managed. Thus, for example, this locale is assumed to be Italy, with the appropriate local holidays then defined in the manner previously described. These local holidays (defined by the class objects) are then stored. At step 64, a display method is invoked to display the calendar. At step 66, a test is run to determine whether the locale in which the calendar is to be displayed has an associated holiday file listing. If the outcome of the test at step 66 is negative, the routine branches to step 68 to display a default holiday file listing, i.e. a listing with no holidays included. This step ensures that non-local holidays are not displayed by mistake or in a manner that might otherwise offend local culture or custom. If, however, the outcome of the test at step 68 indicates that the calendar has an associated holiday file listing, the routine continues at step 70 to retrieve the file. The holidays are then selectively displayed at step 72. By "selectively", it is meant that a given holiday is displayed on the calendar if it occurs in the given time period (e.g., a "month") being then currently displayed. Of course, date/holiday information may be displayed in other than monthly cycles. At step 74, a test is run repeatedly to determine whether the locale has been changed. If the outcome of the test is negative, the routine cycles. If, however, the result of the test at step 74 indicates that the locale has changed, the routine returns to step 66 and repeats the above-described steps. This processing provides runtime switching between selected sets of holiday objects that comprise the individual locale-specific calendars.

The inventive holiday calendar is useful to provide support for all significant calendar systems in use in the business world today. As is well-known, the Gregorian calendar is the primary calendar in world-wide business use. It is a solar calendar with a 365 day year, with leap year rules adjusting for variations in the Earth's rotational speed. The Gregorian calendar is a derivative of the Julian calendar using expanded leap year rules to compensate for differences between the solar year and the calendar year length. According to the invention, Gregorian is the default calendar displayed if no calendar style is specified. The Gregorian calendar also implements the proper leap year rules to be year 2000 (Y2K) compliant.

Referring now back to FIG. 7, as noted above, the days of the week are displayed in the calendar in a locale-specific context. Thus, the day names preferably are loaded from Java-supplied resource bundles and are derived from the current locale setting or the stored administrator preferences of locale and language. The beginning day of the week for the set locale is also honored. The days are abbreviated where permitted by language and locale and calendar style.

As illustrated in FIG. 5A, the calendar preferences panel enables the user to select the default calendar style of the calendar. Selecting different types of calendars alters the options available as well as the default first days. With reference to FIG. 5A, the following are the options that apply to the selected calendar style.

The following options apply to the selected calendar style.

Display eras—Add the era to the year display

Abbreviated days—Show days as abbreviated or in full on the days of the week controls. This option is disabled if the calendar style is Hijri, Hebrew or Japanese Era.

Abbreviated months—Show months as abbreviated or in full on the month control. This option is disabled if the calendar style is Hijri, Hebrew or Japanese Era.

Display bi-directionally—Allows Hijri or Hebrew calendars to be displayed in a left to right form, Constrain date selection—Allows selection of dates prior to the current date.

Minimum days in the first week—Number of days that compose a complete first week of the month.

An array of radio buttons is provided to allow the user to set the first day of the week shown on the calendar. This element is set by the current locale. The default setting is the Java default for the current locale.

Referring now to FIG. 5B, the date panel allows the administrator to select preferences for the display of time zone, formal and informal date format. The following options are preferably available:

Time Zone—Select the time zone that you wish to use for date calculation. Dates are stored as an offset from GMT.

Formal date format—The display mask that the user wishes to use for formatting the formal (long) date display. The format varies by locale.

SHORT is completely numeric, such as 12.13.52 or 3:30 pm

MEDIUM is longer, such as Jan. 12, 1952

LONG is longer, such as Jan. 12, 1952 or 3:30:32 pm

FULL is pretty completely specified, such as Tuesday, Apr. 12, 1952 AD or 3:30:42 pm PST.

Formal date format example—An example of the formal (long) date display.

Informal date format—The display mask that the user wishes to use for formatting the informal (short) date display.

Tracking and storing changes to user configurable aspects of the calendar is preferably done by preserving the alterations in a serialized file. The calendar preference class (CalendarPrefs.class) encapsulates all of the preferences.

// Calendar Preference properties:

```
public int              ivCalstyle; //preferred calendar style
public TimeZone         ivCalTZ;        //local timezone
public TimeZone         ivUTCTZ;        //UTC timezone
public SimpleDateFormat ivFormalDateFormat;//LONG, SHORT,
MEDIUM or LONG
public SimpleDateFormat ivInformalDateFormat;// LONG, SHORT,
MEDIUM or LONG
public int              ivFirstDayOfWeek; //first day of the week
public int              ivMinFirstDaysInWeek; //minimal days -
first week
public Vector           ivWeekend;        //days of the
weekend
public boolean          ivEras;           //display eras
public boolean          ivAbbDays;        //abbreviated days
public boolean          ivAbbMonths;      //abbreviated
months
public boolean          ivAbbAllowed;     //abbreviations
allowed
public boolean          ivDisplayBIDI;    //display Bi-
directionally
public boolean          ivConstrain       //date
constraining on
public Point            ivSetDateLocation; //Set date
dialogue location
public Dimension        ivSetDateSize;    //Set date
dialogue size
public Point            ivAddHolidayLocation;  //Add holiday
dialogue location
public Dimension        ivAddHolidaySize;  //Add holiday
dialogue size
public Point            ivPreferencesLocation;  //Preferences
dialogue location
public Dimension        ivPreferencesSize;  //Preferences
dialogue size
```

Preferences for Calendar Styles:

```
//Gregorian calendars
    //AL_GREGORIAN && CAL_GREGORIAN_WRAP
    //Hijri calendar
    //CAL_HIJRI_ARABIC && CAL_HIJRI_ARABIC_EN &&
        CAL_HIJRI_HINDI
public int              ivHijriFirstDayOfWeek;     //first day of
```

-continued

```
the week
public Vector        ivHijriWeekend;           //days of the
weekend
    //Hebrew
    //CAL__HEBREW && CAL__HEBREW__EN
public int           ivHebrewFirstDayOfWeek;   //first day of
the week
public Vector        ivHebrewWeekend;          //days of the
weekend
//Japanese era
    // CAL__JAPANESE__ERA && CAL__JAPANESE__ERA__EN
```

Component Files:

The following components of UFCalendar may be obtained from a calendar file system:

| | |
|---|---|
| AddHolidayDialog.java | Dialogue to add a holiday to the serialized holiday list |
| CalendarPrefs.java | Calendar preferences |
| DatePanel.java | Date style panel for preferences dialogue |
| DefineHolidayPanel | Dialogue to create a holiday |
| FormulaPanel | Dialogue for specifying holiday repetition |
| HebrewCalendar.java | Hebrew calendar class |
| HijriCalendar.java | Hijri calendar class |
| HolidayPanel.java | Holiday panel for preferences dialogue |
| PrefPanel.java | Color panel for preferences dialogue |
| SetDateDialog.java | Set the calendar date dialogue |
| StylePanel.java | Style panel for preferences dialogue |
| UFCalendar.java | The main calendar class |
| UFCalendarButton.java | A popup calendar button |
| UFCalendarField.java | Calendar field class |
| UFCalendarFormula | Class definition for holiday formula |
| UFCalendarHoliday.java | Calendar holiday class |
| UFCalendarJapanEra.java | Japanese Era calendar class |
| UFCalendarListener.java | Calendar listener class |
| UFCalendarMultiField.java | Calendar Multi-field class |
| UFCalendarPrefs.java | Calendar preferences class |
| UFPopupWindow.java | Popup window for UFCalendar button |
| TCal.java | Driver for testing calendar |

The following resources of UFCalendar may be obtained from a resource file system:

| | |
|---|---|
| CalendarHolidays.java | Holidays list default (no holidays) |
| CalendarHolidays__en__US.java | USA holidays list |
| CalendarJapanEras.java | Japanese eras |
| CalendarResources.java | Calendar human language data |
| CalendarSymbols.java | Element of calendar to utilize |
| LanguageResources.java | Language resources. |

The following framework dependencies may be obtained from the file system:

| | |
|---|---|
| UFResourceLoader | Framework resource loaded |
| UFExceptionHandler | Exception handler for framework. |
| IString | International strings |

Calendar Constructors:

The calendar implements a variety of constructors for creation. For complete details on the constructors, reference may be made to the Javadoc html file.

UFCalendar( )
    Default parameter less constructor for creating the calendar as a bean.
UFCalendar (boolean fAddPopupMenu)
    Constructs a calendar using the current time in the default time zone with the default locale. The user must specify a frame for the calendar and a boolean value for addition of the popup menu.
UFCalendar (int iCalendarType, boolean fAddPopupMenu)
    Constructs a calendar using the default time in the default time zone with the default locale. The user must specify a panel for the calendar, a calendar style and a boolean value for addition of the popup menu.
UFCalendar (boolean fAddPopupMenu, boolean fAddMonthSel, boolean fAddYearSel)
    Constructs a calendar using the default time in the default time zone with the default locale. The user must specify a panel for the calendar, a boolean value for addition of the popup menu, a boolean value for addition or deletion of the month selector and a boolean value for the addition or deletion of the year selector.
UFCalendar(boolean fAddPopupMenu, Locale loc)
    Constructs a calendar using the default time in the default time zone with the provided locale. The user must specify a panel for the calendar, a calendar style and a locale of the calendar.
UFCalendar (boolean fAddPopupMenu, Date pDate)
    Constructs a calendar using the provided date. The user must specify a panel for the calendar, a boolean value for addition of the popup menu, and a date for the initial calendar date.
UFCalendar (boolean fAddPopupMenu, Locale loc, Date pDate, TimeZone Tz)
    Constructs a calendar using the provided locale, date, and TimeZone. The user must specify a panel for the calendar, a locale value, a date for the initial calendar date and a timezone.

Programmable Interface (APIs):

This section outlines the methods that may be programmatically set in the UFCalendar. These methods are for programs to invoke at runtime. Detailed usage information can be obtained from the Javadoc html file for UFCalendar.

```
    setDate
    Sets the calendar's date. The calendar will display the month
that contains the passed Gregorian Java date irrespective of the
style of the calendar.
public void setDate (Date dt)
    getDate
    Return the calendar's currently selected date.
public Date getDate ()
    setSelectedDays
    Set the vector of selected days.
public void getselectedDays (Vector v)
    getSelectedDays
    Return the vector of selected days.
public Vector getselectedDays ()
    setYear
    Set the year.
public void setYear (int iYr)
    getYear
    Return the currently selected year.
public int getYear ()
    setMonth
    Set the month.
public void setMonth (int iMt)
    getMonth
    Return the currently selected month
public int getMonth ()
    setMultiSelect
    Allow multiple selection of dates.
public void setMultiSelect (boolean fMulti)
    goToDate
    Go to date.
public void goToDate (Date dt)
    setTimeZone
    Set the time zone.
```

-continued

```
public void setTimezone (Timezone tzID)
        getTimeZone
    Set the time zone.
public TimeZone getTimeZone ()
        setLocale
    Set the locale.
public void setLocale (Locale loc)
        getLocale
    Return the locale.
public Locale getLocale ()
        setCalendarStyle
    Set the calendar style, with one of the following constants
used.
CAL_GREGORIAN          Gregorian calendar (default)
CAL_GREGORIAN_WRAP     Gregorian calendar, wrapped head to
                       tail
CAL_JAPANESE_ERA       Japanese Era calendar
CAL_JAPANESE_ERA_EN    Japanese Era calendar in Romanji
CAL_HIJRI_ARABIC       Hijri calendar, Arabic numerals
CAL_HIJRI_ARABIC_EN    Hijri calendar English, Arabic
                       numerals
CAL_HIJRI_HINDI        Hijri calendar, Hindi numerals
CAL_HEBREW             Hebrew calendar
CAL_HEBREW_EN          Hebrew, English transliteration
CAL_CHINESE_LUNAR      Chinese Lunar calendar
CAL_CHINESE_TAIWAN     Chinese Taiwan Era calendar
CAL_ISO                ISO commercial calendar
CAL_JULIAN             Julian calendar
CAL_SCALIGER           Scaliger calendar
public void setCalendarstyle (int iCS)
        getCalendarStyle
    Return the calendar style and int constant. See UFCalendar
JavaDoc HTML.
public int getCalendarStyle ()
        setCalendarGroup
The individual calendar styles are also grouped according to type.
For example a Japanese Era calendar is a Gregorian calendar. The
following constants are used:
LUNAR
GREGORIAN
HIJRI
HEBREW
JULIAN
            ASTRONOMICAL
        getFirstDayOfWeek
    Return the starting day of the week, 0–6 (Sunday through
Saturday).
public int getWeekStart ()
        setFirstDayOfWeek
    Set the starting day of the week.
        getMinDaysInFirstWeek
    Return the minimal number of days in the first week of a month.
public int getMinDaysInFirstWeek ()
        setMinDaysInFirstWeek
    Set the minimal number of days in the first week of a month.
public void setMinDaysInFirstWeek (int iMinDays)
        getWeekend
    Set the days that compose the weekend, 0–6 (Sunday through
Saturday).
public vector setWeekendDays ()
        setWeekEnd
    Return the days that compose the weekend, 0–6 (Sunday through
Saturday).
public void setWeekendDays (Vector vWEDays)
        getAbbreviatedDays
    Get abbreviated days of the week text.
public boolean getAbbreviatedDays ()
        setAbbreviatedDays
    Set abbreviated days of the week text if allowed by the
calendar type.
public void setAbbreviatedDays (boolean f)
        getAbbreviatedMonths
    Return abbreviated month of the week set.
public boolean getAbbreviatedMonths ()
        setAbbreviatedMonths
    Set abbreviated month text if allowed by the calendar type.
public void setAbbreviatedMonths (boolean f)
        getConstrainDate
    Return constraining date.
```

-continued

```
public Date getConstrainDate ()
        setConstrainDate
    Set constraining day.
```

Creating Calendars

| Creating Calendars |
|---|
| Creating a Calendar in a Panel |

To display a calendar in a panel; invoke the following constructor, and register a PropertyChangeListener to notify the application of date selection events.
boolean fAddMenu = true;
UFCalendar UFCal = new UFCalendar (fAddMenu);

| Creating a Calendar Date Field |
|---|

To display a calendar field in a panel; invoke the following constructor, and register a PropertyChangeListener to notify your application of date selection events.
UFCalendarField dateField = new UFCalendarField ();

| Creating a Multiple Date Selection Calendar |
|---|

To display a calendar multiple selection field in a panel invoke the following constructor, and register a PropertyChangeListener to notify your application of date selection events.
UFCalendarMultiField dateField = new UFCalendarMultiField ();

Translation to Other Languages

| Translation to Other Languages |
|---|

The calendar component is designed to be as simple as possible and to contain all text for translation to a small number of files.

| Items Not Translated |
|---|
| Day and Month Names |

The month names and day of the week names are loaded from Java resources, the calendar does not contain any of this text. Thus, no translation of these items is necessary, all languages and locales supported by Java will display correct weekday and month names without translation.

| Japanese Era, Hebrew and Hijri Calendars |
|---|

The weekday and month names for Japanese Era, Hebrew and Hijri calendar are stored in the resource bundle CalendarSymbols.java. This file preferably does not require translation as they are always presented in the original languages.

| Holidays |
|---|

Add the holidays that are used in your locale. The format is date as mm/dd/yyyy and holiday name. The text of the names for holidays and the dates are stored in a resource named CalendarHolidays_ + (language code) + _ + (country code). Thus holidays for the United States of America are stored in the file CalendarHolidays_en_US.java. For the Italian languages and locale, the file should be named CalendarHolidays_it_IT.java. The translator must create this file. Use CalendarHolidays_en_US.java as a template for the file.

Figure 10:
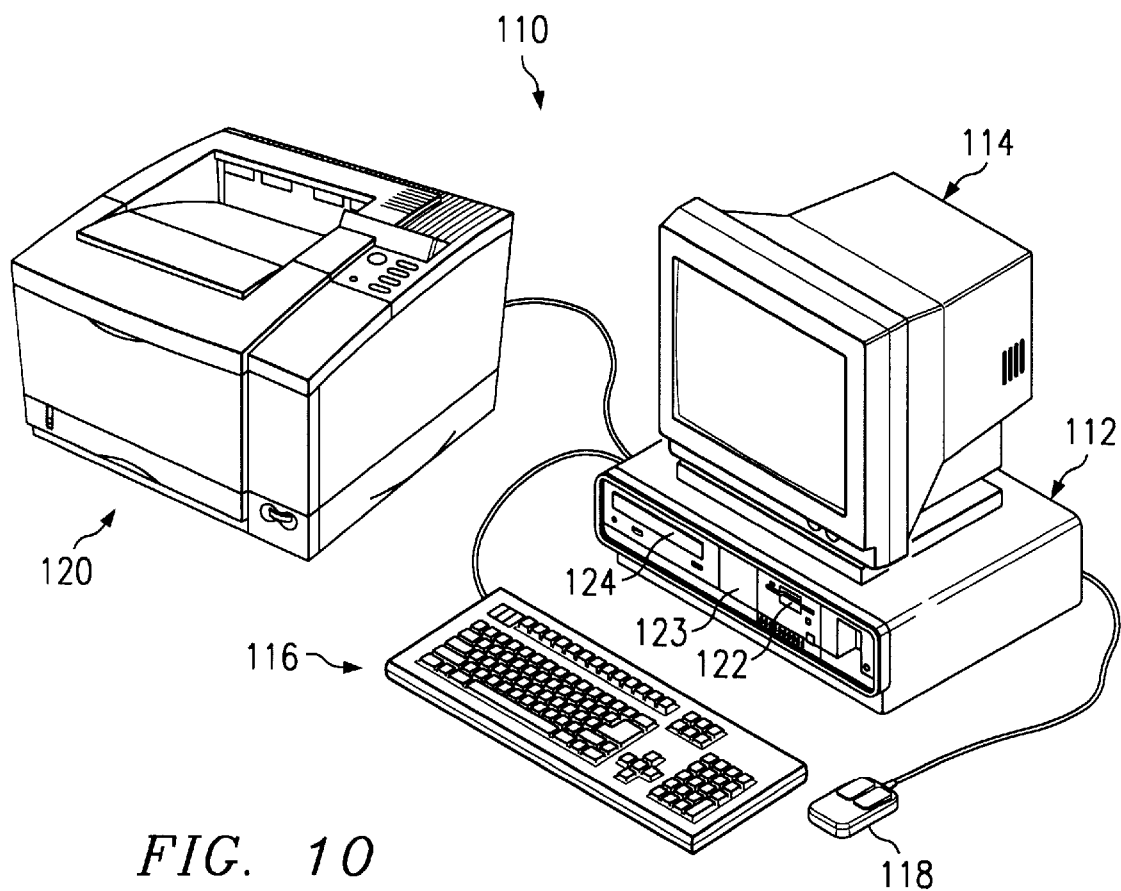
FIG. 10 is a representative data processing system having a display device on which locale-specific calendars are displayed according to the invention.

One of ordinary skill in the art will appreciate that the inventive holiday calendar is adapted for display on a display device of a data processing system. One such system is illustrated in FIG. 10 and includes system unit 112, display device 114, keyboard 116, mouse 118 and printer 120. The system unit 112 receives data for processing from input devices such as keyboard 116 and mouse 118, or via networking interfaces (not illustrated). Mouse 118 is preferably used in conjunction with a graphical user interface (GUI) in which hardware and software system objects, including data processing system components and application programs, are controlled through the selection and manipulation of associated graphical objects displayed on display device 114. To support storage and retrieval of data, system unit 112 further includes diskette drive 122, hard disk drive 123, and CD-ROM drive 124, which are connected to system unit 112 in a well-known manner. Data processing system may be diskless, otherwise known as a network computer.

One of ordinary skill will appreciate that a "holiday" as envisioned by the present invention should not be limited to a holiday in the legal or political sense of the word (e.g., a U.S. legal holiday such as Independence Day). Generalizing, a "holiday" should be broadly construed to cover any given type of event that may be designated by the administrator or a third party to have local significance in the locale (even though the event may not have significance in some other locale in which the managed region is supported). Thus, the present invention thus may also be used to display locale-sensitive information besides legal holidays. For example, given locales may designate certain days of the calendar for carrying out given management or other operations.

One of the preferred implementations of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims.

Having thus described our invention, what we claim as new and desire to secure by letters patent is set forth in the following claims:

What is claimed is:

1. A display method operative within a display device of a data processing system connected in a distributed computing environment having nodes located across geographically-dispersed boundaries, comprising the steps of:
defining a set of holiday objects corresponding to a set of holidays specific to a given locale;
determining if the data processing system is operative within the given locale; and
selectively displaying a calendar, together with at least one holiday defined by at least one of the set of holiday objects, if the data processing system is operative within the given locale.

2. The display method as described in claim 1 wherein a holiday object is defined according to an object-oriented class construct.

3. The display method as described in claim 2 wherein the holiday object includes information identifying the name of the holiday.

4. The display method as described in claim 2 wherein the holiday object includes information identifying the given locale.

5. The display method as described in claim 2 wherein the holiday object includes information identifying whether the holiday begins at a given time.

6. The display method as described in claim 2 wherein the holiday object includes information indicating whether the holiday repeats on a given temporal basis.

7. The display method as described in claim 2 wherein the holiday object includes information identifying a formula by which the holiday repeats.

8. The display method as described in claim 2 wherein the holiday object includes information identifying a start date and time and an end date and time.

9. The display method as described in claim 8 wherein the start time and date and the end time and date are synchronized with respect to a given time zone.

10. The display method as described in claim 1 wherein the calendar displays a given month adapted to display date conventions of the given locale.

11. A display method operative within a display device of a data processing system connected in a distributed computing environment having nodes located across geographically-dispersed boundaries, comprising the steps of:
defining a set of holiday objects corresponding to a set of holidays specific to a given locale;
if the data processing system is not operative within the given locale, displaying a calendar without any holiday specific to the given locale; and
if the data processing system is operative within the given locale, selectively displaying the calendar, together with at least one holiday defined by at least one of the set of holiday objects.

12. The display method as described in claim 11 wherein the calendar displays a given month adapted to display date conventions of the given locale.

13. The display method as described in claim 11 wherein a holiday object is defined according to an object-oriented class construct.

14. The display method as described in claim 11 wherein the display device includes a graphical user interface for displaying a graphical representation of the calendar.

15. The display method as described in claim 14 wherein the graphical representation is generated using local object-oriented display resources.

16. The display method as described in claim 15 wherein the local object-oriented display resources are Java calendar classes.

17. A display method operative within a display device of a data processing system connected in a distributed computing environment having nodes located across geographically-dispersed boundaries, comprising the steps of:
defining at least first and second sets of holiday objects, each set of holiday objects corresponding to a set of holidays specific to a respective first or second locale;
if the data processing system is operative within the first locale, selectively displaying a calendar, together with at least one holiday defined by the first set of holiday objects;
if the data processing system is operative within the second locale, selectively displaying a calendar, together with at least one holiday defined by the second set of holiday objects.

18. The display method as described in claim 17 wherein the calendar displays a given month adapted to display date conventions of the given locale.

19. A computer program product in a computer-readable medium for controlling a data processing system having a display device, comprising:

means for defining a set of holiday objects corresponding to a set of holidays specific to a given locale; and means for selectively displaying on the display device a calendar, together with at least one holiday defined by at least one of the set of holiday objects, if the data processing system is operative within the given locale.

20. The computer program product as described in claim 19 wherein the means for defining a set of holiday objects includes graphical user interface display panel means for displaying a list of locale-specific holidays.

21. The computer program product as described in claim 20 wherein the means for defining a set of holiday objects further includes a graphical user interface display panel for adding a holiday to the list of locale-specific holidays.

22. The computer program product as described in claim 21 wherein the graphical user interface display panel includes a field for identifying a name of the holiday.

23. The computer program product as described in claim 21 wherein the graphical user interface display panel includes fields for identifying start and end dates for the holiday.

24. The computer program product as described in claim 21 wherein the graphical user interface display panel includes a field for identifying whether the holiday begins at a given time.

25. The computer program product as described in claim 21 wherein the graphical user interface display panel includes a field for identifying a cycle of the holiday.

26. A data processing system connected in a distributed computing environment having nodes located across geographically-dispersed boundaries, comprising:

a processor;

an operating system;

a display device running a graphical user interface;

means for defining a set of holiday objects corresponding to a set of holidays specific to a given locale; and means for selectively displaying on the display device a calendar, together with at least one holiday defined by at least one of the set of holiday objects, if the data processing system is operative within the given locale.

27. The data processing system as described in claim 26 wherein the means for defining a set of holiday objects includes graphical user interface display panel means for displaying a list of locale-specific holidays.

28. The data processing system as described in claim 27 wherein the means for defining a set of holiday objects further includes a graphical user interface display panel for adding a holiday to the list of locale-specific holidays.

* * * * *